United States Patent [19]
Hill, Jr.

[11] 3,752,203
[45] Aug. 14, 1973

[54] LOCK-SCREW FASTENERS
[75] Inventor: William E. Hill, Jr., Rock Falls, Ill.
[73] Assignee: Hill Fastener Corporation, Rock Falls, Ill.
[22] Filed: July 28, 1971
[21] Appl. No.: 166,764

[52] U.S. Cl............................................151/37
[51] Int. Cl....................................F 16b 39/282
[58] Field of Search................. 151/37, 41.72, 37, 151/35

[56] References Cited
UNITED STATES PATENTS

| 472,413 | 4/1892 | Wall | 151/35 |
|---|---|---|---|
| 723,590 | 3/1903 | Dunbonaw | 151/35 |
| 1,183,174 | 5/1916 | Dice | 151/35 |
| 1,612,955 | 1/1927 | Valberg | 151/35 |
| 715,891 | 12/1902 | Somenby | 151/37 |
| 2,147,209 | 2/1939 | Olson | 151/37 |
| 3,078,899 | 2/1963 | MacLean | 151/37 |

FOREIGN PATENTS OR APPLICATIONS
370,948   4/1932   Great Britain.................. 151/41.72

Primary Examiner—Edward C. Allen
Attorney—Andrew F. Wintercorn

[57] ABSTRACT

The present lock-screw fasteners involve the provision of a ring of inclined V or chevron-shaped locking projections on the under-side of an annular flange on the head of a lock-screw or a lock-nut, these projections being arranged so that the points, all of which are on a circle around the center line, are in trailing relation in the tightening of the screw or nut and are accordingly in leading relationship to take the best possible hold in turning in the opposite direction for a good locking action. In the tightening, razor sharp edges are swedged on the projections to increase the take-hold action to resist turning in a loosening direction.

6 Claims, 5 Drawing Figures

Patented Aug. 14, 1973
3,752,203
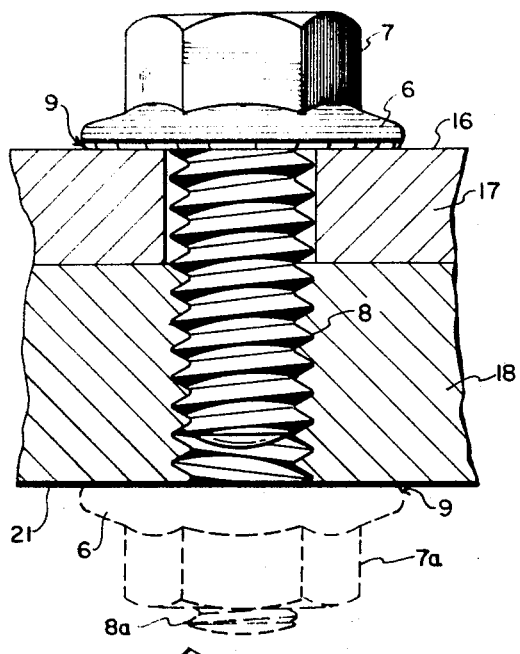
FIG. 1
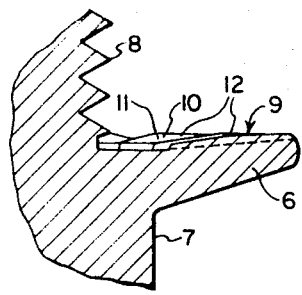
FIG. 4
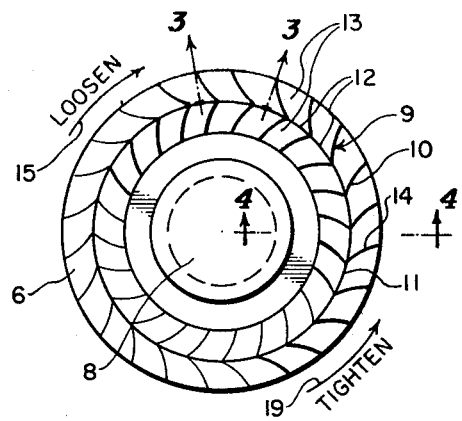
FIG. 2
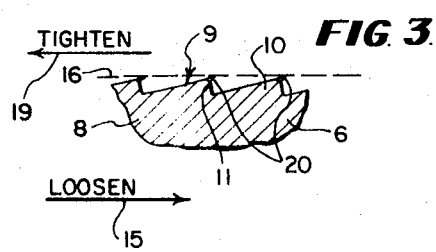
FIG. 3
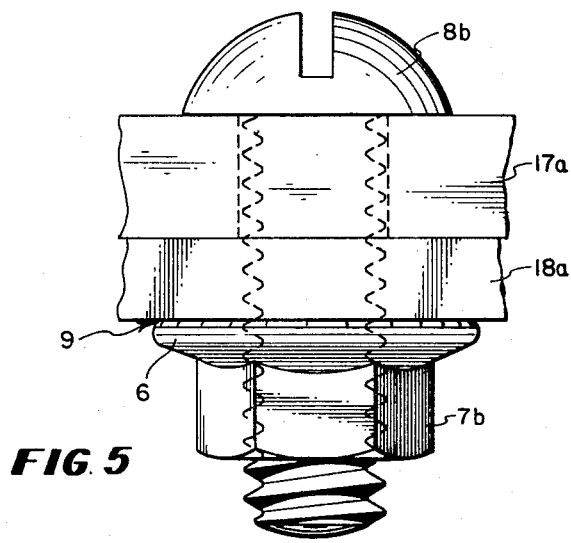
FIG. 5
INVENTOR:
WILLIAM E. HILL JR.
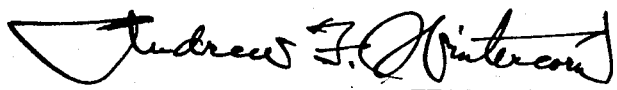
ATTORNEY

LOCK-SCREW FASTENERS

This invention relates to locking screw fasteners, the improvements residing in a circular series of inclined V or chevron-shaped projections provided on the underside of an annular flange on the head of a lock-screw or on a lock-nut, the points of these locking projections, all of which are in a circle around the center line, are in trailing relation in the tightening of the screw or nut and are accordingly in leading relationship to take the best possible hold when turning in the opposite direction for a good locking action. In the tightening, razor sharp edges are swedged on the projections to increase the take-hold action to resist turning in a loosening direction.

The invention is illustrated in the accompanying drawing, in which:

FIG. 1 is a section showing a lock-screw made in accordance with my invention fastening two parts together, showing, also in dotted lines, a lock-nut embodying the improvements of my invention;

FIG. 2 is an end view of the lock-screw looking at the bottom of the annular flange and showing the circular series of V or chevron-shaped locking projections;

FIG. 3 is a developed sectional view on the arcuate line 3—3 of FIG. 2 on an enlarged scale showing in full lines the original shape of the locking projections but indicating in dotted lines in exaggerated fashion the result of swedging action in the tightening direction to define sharp edges for improved take-hold action to resist loosening;

FIG. 4 is a correspondingly enlarged sectional detail on the line 4—4 of FIG. 2, and FIG. 5 is a side view of a screw and nut fastening two parts together, the nut being a lock-nut embodying the improvements of my invention similarly as the dotted line lock-nut of FIG. 1.

The same reference numerals are applied to corresponding parts throughout the views.

Referring to the drawing, at first especially FIGS. 2, 3 and 4, the annular flange 6, which is shown in FIG. 1 as provided on the head 7 of a lock-screw 8, has stamped or otherwise defined on its under-side of a circular series 9 of inclined V or chevron-shaped projections 10, the points 11 of which are all in a circle around the center line of the screw and head and, of course, the flange 6. The points 11 are the high points at the extremities of the ratchet-like projections 10 and are all on the circle with the center thereof on the center line. The projections are all inclined at the same small acute angle relative to the plane of the flange. The projections 10 are V-shaped in transverse section, to improve the take-hold action. Thus, there is a ridge 12 lengthwise of the middle of each of the projections 10 extending downwardly from the high point 11, and flat oppositely inclined surfaces 13 are defined on opposite sides of the center ridge line 12 on each of the projections 10.

In operation, it should be clear that the sharp points 11 on the V-shaped front faces 14 serve as spearheads when the screw is turned in a clockwise direction, as shown at 15 in FIG. 2 for loosening, thereby cutting into the surface 16 (FIG. 1) on the adjacent workpiece 17 fastened by means of screw 8 to another workpiece 18, thereby resisting the loosening of the screw. On the other hand, when the screw is being tightened, as indicated by the arrow 19 in FIG. 2, it is clear that the projections 9 offer an absolute minimum of resistance to turning in the tightening of the head 7 of the screw against the surface 16, and, assuming the screw 8 is tightened sufficiently, there is a certain amount of swedging action on the high points 11 of the projections 10, as indicated in dotted lines at 20 in FIG. 3, to define razor sharp trailing edges on the projections 10, which, when an effort is made to loosen the screw 8, are bound to improve the take-hold action of the projections 10 to a marked degree. Of course, in the stamping of the projections 9 there is a certain degree of compression of the metal so that the projections 9 are all closer grained to a marked degree in relation to the rest of the metal in the flange 6 and head 7, and this close graining of the metal naturally improves the take-hold action of the swedged portions 20 at the high points 11, while, of course, reducing the amount of swedging action to a certain degree. It is, of course, understood that the lock-screws 8, after being stamped to define the V or chevron-shaped projections 10 may be, and preferably are, subjected to a hardening heat treatment to obtain precisely the desired degree of hardness for best lock-screw action. Due to the concentric relationship of the projections 10 with respect to the screw 8 the take-hold action is uniform in the tightening of the screw and there is no extra load placed on the turning of the screw, as by a binding action.

The invention, as indicated in dotted lines at 7a in FIG. 1, is also applicable to lock-nuts on the under-side of the flange 6 thereof when the screw 8 extends sufficiently below the workpiece 18 as indicated at 8a to apply a lock-nut like that shown at 7a, the flange 6 on this nut having a circle 9 of V or chevron-shaped projections 10 on the underside thereof to engage the surface 21 of the workpiece 18. Obviously, with locking action on both the head 7 of bolt 8 and on the nut 7a, it goes without saying that the doubled locking action makes assurance doubly sure that the fastening will not loosen.

Referring to FIG. 5, the lock-nut 7b is like the lock-nut 7a, having a circle 9 of projections 10 on the underside of the flange 6 thereof to give the same locking action as in the case of the lock-nut 7a and the head 7 of the lock-screw 8 in FIG. 1, the nut 7b in this view threading on the projecting end of the screw 8b, which in this view cooperates with the lock-nut 7b in fastening together the two workpieces 17a and 18a.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A fastener for a work piece comprising:
   a body having a center line and an annular workpiece engaging surface;
   a threaded portion of said fastener extending in a direction transverse to said annular work piece engaging surface;
   said surface including a plurality of projections extending therefrom;
   said projections being arranged in a circle on said annular surface;
   certain of said projections each being inclined at an acute angle relative to the surface with their high ends in substantially the same plane normal to said center line;

each of said high ends lying in a circle and pointing in the opposite direction in relation to the direction of tightening of the fastener, whereby said high ends offer low resistance to tightening and high resistance to loosening said fastener;

each of said projections having a first side surface and a second side surface extending downwardly from said high end;

each of said first side surfaces extending in a direction inwardly of said circle and in the direction of tightening said fastener;

each of said second side sufaces extending in a direction outwardly of said circle and in the direction of tightening of said fastener;

each of said first side surfaces intercepting a second side surface substantially along said circle, whereby a ridge extending from each high end downwardly to the base of another of said projections is formed such that a section taken along said circle through said projections is in the form of a sawtooth;

the upper edge of said first and second side surfaces facing in the opposite direction in relation to the direction of tightening said fastener and extending downwardly from said high ends and in the direction of tightening of the fastener, whereby said upper edges form a plurality of V-shaped edges opening in the direction of tightening said fastener; first and second front surfaces;

said first and second front surfaces intersecting said first and second side surfaces respectively at said upper edge and having a slope greater than the slope of said side surfaces, whereby said upper edge is relatively sharp.

2. A fastener according to claim 1 in which the high ends are upwardly turned and sharply pointed whereby the trailing edges of the projections in the tightening of the fastener are swaged to define sharp edges for improved take-hold action when the fastener is turned in a loosening direction.

3. A fastener according to claim 1 in which the work-piece engaging surface is provided on the bottom of the head of a screw.

4. A fastener according to claim 3 in which the head of the screw includes a flange positioned along its lower surface, said work-piece engaging surface being provided on the bottom of said flange;

5. A fastener according to claim 1 in which said work-piece engaging surface is formed on the bottom of a lock-nut.

6. A fastener according to claim 5 in which said lock-nut includes a flange extending from one of its surfaces; said work-piece engaging surface being upon one surface of said flange.

* * * * *